United States Patent [19]

Milkovich et al.

[11] 4,408,006
[45] Oct. 4, 1983

[54] STAR ELASTOMERS IN FOOTWEAR COMPOUNDS

[75] Inventors: Ralph Milkovich, Paoli; David R. Warfel, Exton, both of Pa.

[73] Assignee: Atlantic Richfield Company, Los Angeles, Calif.

[21] Appl. No.: 274,699

[22] Filed: Jun. 17, 1981

Related U.S. Application Data

[63] Continuation-in-part of Ser. No. 73,393, Sep. 7, 1979, abandoned.

[51] Int. Cl.³ .................. C08L 9/06; C08L 47/00
[52] U.S. Cl. .................................... 524/534; 524/505; 525/314
[58] Field of Search ............... 524/534, 505; 525/314

[56] References Cited

U.S. PATENT DOCUMENTS

| | | | |
|---|---|---|---|
| 3,280,084 | 10/1966 | Zelinski et al. | 525/55 |
| 3,485,787 | 12/1969 | Haefele et al. | 524/474 |
| 3,637,554 | 1/1972 | Childers | 525/98 |
| 3,949,020 | 4/1976 | Prudence | 525/314 |
| 3,985,830 | 10/1976 | Fetters et al. | 525/271 |
| 4,107,124 | 8/1978 | Himes | 524/445 |
| 4,117,037 | 9/1978 | Himes | 525/314 |
| 4,141,876 | 2/1979 | Hansen | 525/95 |
| 4,163,765 | 8/1979 | Moczygemba | 525/314 |

Primary Examiner—Ronald W. Griffin
Attorney, Agent, or Firm—Lewis J. Young

[57] ABSTRACT

Footwear compounds having greater hardness of compound and more resistance to motor oils have been prepared starting with star-block elastomers of monovinyl aromatic compounds and conjugated dienes. The star-block elastomers have 7 to 12 arms.

4 Claims, No Drawings

STAR ELASTOMERS IN FOOTWEAR COMPOUNDS

RELATED APPLICATIONS

This application is a continuation-in-part of application Ser. No. 73,393 filed Sept. 7, 1979 abandoned.

BACKGROUND OF THE INVENTION

The present invention relates to resinous star-block copolymers having improved impact properties and good clarity. More specifically the invention relates to footwear compounds comprising these resinous star-block copolymers.

Highly branched block copolymers, sometimes called star-block copolymers, are old in the art of anionic polymerization. These star-block copolymers are prepared by first forming linear block polymers having active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave star-block copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Zelinski, U.S. Pat. No. 3,281,383, teaches similar star-block copolymers to those in U.S. Pat. No. 3,280,084, except that coupling agents such as polyepoxy compounds, polyacids, polyaldehydes, etc., are used.

Haefele et al, U.S. Pat. No. 3,485,787, produces elastomeric compositions by blending mineral oils with thermoplastic linear triblock copolymers.

Childers, U.S. Pat. No. 3,637,554, prepares rubbery star-block copolymers having nuclei formed from polyepoxides, polyisocyanates, polyimines, etc., and identical arms from B-Li and A-B-Li.

Fetters et al, U.S. Pat. No. 3,985,830, discloses a product having a nucleus of more than one molecule of m-divinyl-benzene and at least three polymeric arms, each being a block copolymer of conjugated diene and monovinyl aromatic monomers wherein said conjugated diene block is linked to said nucleus.

Himes, U.S. Pat. No. 4,107,124, teaches compositions comprising star-block copolymers, polystyrenes, mineral oil, and a finely divided filler for use in shoe sole compositions.

Hansen, U.S. Pat. No. 4,141,876, produces adhesive compositions by blending a hydrogenated star-block copolymer with mineral oil, a polyphenylene ether resin, and a tackifying resin.

SUMMARY OF THE INVENTION

We have now found that elastomeric star-block copolymers can be made which have greater oil extendability and whose extended formulations have greater hardness of compound and more resistance to motor oils than formulations made with other copolymers.

The copolymers contain 25 to 55 percent by weight, preferably 30 to 50 percent by weight, of a monovinyl aromatic compound and 45 to 75 percent by weight, preferably 50 to 70 percent by weight, of a conjugated diene having 4 to 8 carbon atoms. The copolymers have the general formula $(A-B)_{\overline{m}}X$ where A is a nonelastomeric polymer segment based on the total monovinyl aromatic compound, B is an elastomeric segment based on the conjugated diene, m is an integer between 3 and 20, and X is the radical of a polyfunctional coupling agent forming the nucleus of the star-block copolymer.

DETAILED DESCRIPTION OF THE INVENTION

The elastomeric star-block copolymers of this invention are prepared by a three-stage process of anionic polymerization.

In the first stage, the total amount of monovinyl aromatic compound is polymerized in an inert solvent using a hydrocarbyllithium initiator to form linear segments (A-Li), of the monovinyl aromatic compound having lithium ions at the ends. The polymerization is allowed to proceed to essential completion.

In the second stage, the conjugated diene is added and allowed to proceed to essentially complete conversion to form A-B-Li linear blocks.

In the third stage, a polyfunctional coupling agent is added to the solution of A-B-Li segments and allowed to couple the segments into the radial block copolymer of general formula $(A-B)_{\overline{m}}X$, where m is an integer between 3 and 20, A is the nonelastomeric polymer segment based on the total monovinyl aromatic compound, B is an elastomeric polymer segment based on the conjugated diene and X is the radical of the polyfunctional coupling agent.

The monovinyl aromatic compound useful in the invention is preferably styrene, but may be alkyl substituted styrenes which have similar copolymerization characteristics, such as, alphamethylstyrene and the ring substituted methylstyrenes, ethylstyrenes and t-butylstyrene.

The amount of monovinyl aromatic compound useful in the invention is between 25 and 55 percent by weight, and preferably 30 to 50 percent by weight, based on the total weight of monomers utilized.

The hydrocarbyllithium initiators useful in the invention are the known alkyllithium compounds, such as methyllithium, n-butyllithium, sec-butyllithium; the cycloalkyllithium compounds, such as cyclo-hexyllithium; and the aryllithium compounds, such as phenyllithium, p-tolyllithium and naphthyllithium.

The amounts of hydrocarbyllithium added should be between 0.2 and 10.0 millimoles per mole of monomer. The total amount of initiator used depends on the molecular weight and number of polymer chains desired.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like. The polymerization is carried out in the absence of air, moisture, or any other impurity which is known to be detrimental to anionic catalyst systems. The temperature of polymerization may be conventionally from 0° to 120° C., and preferably between 40° and 80° C.

The polyfunctional coupling agents suitable for the invention may be the polyvinyl aromatic compounds such as divinylbenzene, which although only difunctional as monomers, can polymerize to form polyfunctional agents in situ and serve as coupling agents. Suitable are the ortho-, meta-, or para-divinylbenzenes, or mixtures thereof.

In the case of difunctional agents which polymerize during the coupling reaction, such as divinylbenzene, the amounts of agent to be used must be determined for the conditions of reaction, since the number of equivalent functional sites is variable. However, the amounts will vary only from 2.0 to 10 equivalents, and preferably 2.5 to 8.0 equivalents, of divinylbenzene per equivalent of initiator.

The footwear compounds useful in the present invention are made by intimately mixing:

(a) 100 parts by weight of a thermoplastic elastomer of 25 to 55% by weight of a monovinyl aromatic monomer and 45 to 75% by weight of a conjugated diene monomer of 4 to 8 carbon atoms, which elastomer has an average general formula $(A-B)_{\overline{m}}X$ where A is a non-elastomeric polymer block based on the monovinyl aromatic monomer and having a number average molecular weight of from 10,000 to 35,000; B is an elastomeric polymer block based on the conjugated diene monomer and having a number average molecular weight of from 11,000 to 85,000; m is an integer between 7 and 12, and X is the radical of a polyfunctional coupling agent selected from o-divinylbenzene, m-divinylbenzene, p-vinylbenzene, and mixtures thereof.

(b) about 80–250 parts by weight of a naphthenic extender oil;

(c) about 40–150 parts by weight of a polystyrene material;

(d) about 0–80 parts by weight of a finely divided filler; and (e) about 0–5.0 parts by weight of stabilizers.

The naphthenic extender oils, or paraffinic/naphthenic oils, are usually fractions of refined petroleum products having low aromatic content. Commercial extending oils include Shellflex (sold by Shell Chemical Company) and Tufflo (sold by ARCO Petroleum Products Company).

The polystyrene material may be low molecular weight polystyrene, low molecular weight poly-alphmethylstyrene and the like and are used to modify the properties of the base elastomer.

The finely divided fillers are the inorganic fillers such as amorphous silica, calcium carbonate, titanium dioxide, talc, clays and carbon black.

The stabilizer may be those known to stabilize polymeric materials against oxidation, ultraviolet degradation and thermal degradation.

The blends of this invention can be made on compounding rolls, mixing extruders, Banbury mixers, plastographs, high intensity mixers or any other means which will provide essentially homogeneous mixtures.

The following examples are given to illustrate the invention, but not to limit the claims. All parts and percentages are by weight unless otherwise specified.

EXAMPLE I

A one gallon stirred reactor was charged with 2,000 g. of purified cyclohexane and heated to 60° C. A trace of diphenylethylene (0.2 g.) was added to the cyclohexane by means of a hypodermic needle. A solution of sec-butyl-lithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 13.7 m. moles of sec-butyllithium and 307 g. of styrene and the reactor held at 60° C. for 20 minutes. Analysis of the solution by U.V. analysis showed that less than 0.01% by weight of the styrene monomer remained. Number average molecular weights ($M_n$) of the polystyrene blocks were determined by Gel Permeation Chromatography to be 28,000. At this point, 361 g. of butadiene was added to the reactor and the whole mixture held for 60 minutes to complete the polymerization of the butadiene. The diblock arms thus formed were analyzed by refractive index and found to be 46% by weight styrene and 54% butadiene. There was then added 14.7 g. of divinyl-benzene of 53% purity and the whole was held for 1–2 hours at 70° C. to complete the linking reaction. The system was terminated by the addition of 1 g. of methanol. The polymer solution was transferred to a 5 gallon polyethylene liner, diluted further with acetone and the polymer was precipitated by adding isopropanol under high speed stirring. The polymer was then treated with 0.5 part Polygard HR, a commercial antioxidant, and 0.5 part 2,6-ditert-butyl-4methylphenol per 100 parts by weight of polymer. The wet polymer was dried at 50° C. in an oven under vacuum at less than 100 microns of mercury.

The resulting star-block polymer was found to have about 8 linear arms. Each arm has $M_n$ of about 60,900, made up of a polystyrene block of $M_n$ 28,000 and a polybutadiene block of $M_n$ 32,900. The divinylbenzene was present in an amount of 1.2 parts per hundred of monomer (phm).

Oil-extended star-block copolymer was prepared by placing the neat elastomer in a 1 gallon screw cap jar and redissolving in sufficient cyclohexane to produce a 15% by weight solids solution. Enough oil to give a mixture of 50 parts of oil per hundred parts of elastomer (phr) was then added and the jar was rolled until the oil and elastomer was completely mixed. The mineral oil added was Tufflo 6054, a naphthenic mineral oil sold by ARCO Petroleum Products Company. The oil-elastomer-cyclohexane solution was dried in a vacuum oven following the same procedure used for drying neat polymer, above. The oil extended product was labeled IA for future reference.

A second star-block elastomer was prepared by the above method which had about 7.5 linear arms, each having $M_n$ of about 67,400, made up of 46% by weight of a polystyrene block of $M_n$ 31,000 and 54% by weight of a polybutadiene block of $M_n$ 36,400 The divinylbenzene was present in an amount of 1.33 phm. After extension with 50 phr of Tufflo 6054, the oil extended elastomer was labeled IB for future reference.

The oil extended elastomers IA and IB were evaluated in a medium hardness unit shoe sole formulation and compared with several commercial oil-extended elastomers. The formulation was as follows:

| Ingredient | Parts (By Weight) |
| --- | --- |
| Oil Extended Elastomer | 100.0 |
| Tufflo 6054 Oil | 50.5 |
| Crystal Polystyrene | 35.0 |
| Hi-Sil 233 | 20.0 |
| Zn Stearate | 1.1 |
| Irganox 1010 | 1.1 |

-continued

| Ingredient | Parts (By Weight) |
|---|---|
| DLTDP | 0.6 |

The crystal polystyrene used was Dylene 3D, a crystal polystyrene containing 3% oil sold by ARCO Polymers, Inc. Hi-Sil 233 is an amorphous silica sold by PPG Industries. Irganox 1010 is a hindered phenol antioxidant sold by Ciba-Geigy Corp. DLTDP is the stabilizer, dilaurylthiodiproprionate, sold by Cincinnati Milacron. Commercial oil extended elastomers used for comparison were the following:

Kraton 4122, a linear triblock copolymer of 48/52 styrene/butadiene composition; Kraton 4141, a linear triblock copolymer of 30/70 styrene/butadiene composition; and Kraton 4140, a star-block copolymer of 44/56 styrene/butadiene composition, all sold by Shell Chemical Co.; Solprene 475, a star-block copolymer of 40/60 styrene/butadiene composition; and Solprene 481, a star-block copolymer of 48/52 styrene/butadiene composition, both sold by Phillips Petroleum Co.

The formulations containing the various elastomers were compression molded at 140° C. into 4"×4"×100 mil plaques and 2"×2"×¼" plaques. The Shore A hardness values were determined on an A-2 Durometer 10 seconds after initial contact with the plaque. The tensile strength at break was determined by ASTM-D412 at a test rate of 20 in./min. The melt index was determined by ASTM-D1238-65T at 190° C. under a load of 2.16 Kg. The results are shown in Table I.

TABLE I

| Elastomer | Compression Molded Shore A Hardness | Tensile Strength At Break (psi) | Melt Index |
|---|---|---|---|
| Kraton 4122 | 37 | 560 | 28 |
| Kraton 4141 | 33 | 580 | 32 |
| Kraton 4140 | 42 | 750 | 12 |
| Solprene 481 | 44 | 640 | 9 |
| Solprene 475 | 41 | 620 | 10 |
| IA | 54 | 910 | 3 |
| IB | 59 | 1050 | 1 |

It can be seen that the two star-block elatomers prepared in this Example have greater hardness, higher tensile strength at break, and lower melt index than either the commercial linear triblock elastomers or the commercial star-block elastomers, when used in the same unit sole formulation.

EXAMPLE II

The oil extended star-block copolymer elastomers, IA and IB, prepared in Example I, were blended into a hard unit sole formulation and injection molded in a shoe-sole mold. The soles were tested for hardness, melt index, and in two different flex texts. In the Ross Flexural Test, a small cut was placed in the sole, and the sole was then flexed 500,000 flexes. If no cut-growth occurred, the soles (and the base oil extended elastomer) passed the test. In the oil-resistance test, the surface of the molded sole was coated with motor oil (Gulfpride G) and then flexed in the Ross Flexometer until the sole cracked (failure). The results are shown in Table II, along with a comparison with the commercial oil extended elastomer, Kraton 4122, which is a linear triblock of styrene/butadiene content of 48/52 weight percent ratio.

TABLE II

| Formulation (Parts By Weight) | Kraton 4122 | IA | IB |
|---|---|---|---|
| Elastomer(oil extended 2:1) | 100 | 100 | 100 |
| Tufflo 6054 Oil | 43 | 54 | 54 |
| Crystal Polystyrene | 22 | 23 | 23 |
| Resin 18-290[1] | 11 | 12 | 12 |
| Hi-Sil 233 | 19 | 20 | 20 |
| DLTDP | 0.3 | 0.3 | 0.3 |
| Irganox 1010 | 0.3 | 0.3 | 0.3 |
| Tinuvin P[2] | 0.25 | 0.25 | 0.25 |
| Shore A Hardness (Injection Molded Sole) | 52 | 58 | 63 |
| Melt Index (190° @ 2.16 Kg) | 32 | 3.7 | 0.9 |
| Ross Flexural Test (500,000 Flexes) | Pass | Pass | Pass |
| Oil Resistance Test (Flexes to Failure) | 83,000 | 300,100 | 457,000 |

[1] A low molecular weight poly(alphamethylstyrene) sold by Amoco Oil Co.
[2] A light-stabilizer sold by Ciba-Geigy Corp.

The results point out the usefulness of the star-block elastomers of this invention in hard unit sole formulations. Thus, the formulated compound has greater hardness than those made with presently available commercial copolymers; the oil resistance of the formulated compound is greater; and since the equivalent amount of oil in the formulated compounds gives harder shoesoles, the compounds of this invention can be further extended with oil to give a compound having equivalent hardness to those made with the commercially available oil extended rubbers. This greater oil-extendability is a desirable property.

EXAMPLE III

A 30/70 weight ratio styrene/butadiene block copolymer is prepared as follows: Into a one gallon reactor is charged 2,000 g. of purified cyclohexane. The solvent is heated to 60° C. and dried by titration as in Example I. There is then added 20.0 m. moles of sec-butyllithium initiator and 200 g. of styrene and the reactor held at 60° C. for 20 minutes. Number average molecular weight of the polystyrene blocks thus formed are 10,000. At this point, 468 g. of butadiene is added and allowed to polymerize for 1 hour to complete the polymerization of the diene. The diblock arms will be found to have 30% by weight styrene and 70% by weight butadiene. There is then added 26.8 g. of 53% divinylbenzene (2.12 phm) and the mixture is held at 70° C. for 1–2 hours to complete the coupling reaction. The system is terminated, the polymer stabilized, and the polymer recovered as in Example I. The polymer will have about 10 arms having $M_n$ of about 33,400 made up of polystyrene blocks of $M_n$ 10,000 and polybutadiene blocks of $M_n$ 23,400.

Similarly if one prepares a polymer from 20.0 m. moles of initiator, 267 g. of styrene, 401 g. butadiene and 2.75 phm of divinylbenzene, one obtains a polymer having 40% by weight styrene, 60% by weight butadiene with about 12 arms per star-block polymer. Each arm will have $M_n$ of 33,400 made up of polystyrene blocks of $M_n$ 13,350 and polybutadiene blocks of $M_n$ 20,050.

Both star-block copolymers prepared in this Example III can be oil-extended and compounded into medium hardness unit shoe sole formulations, such as the one in Example I. The sole formulations would both have tensile strengths at break of greater than 900 psi and compression molded Shore A hardness of greater than 50. In either case, the formulations would have greater Shore A hardness than commercial oil extended elastomers having comparable stryene/butadiene ratios.

EXAMPLE IV

Using the procedure of Example I, a star-blok polymer having 8 linear arms was prepared. The arms each had an $M_n$ of about 60,900, made up of a polystyrene block of $M_n$ 28,000 and a polybutadiene block of $M_n$ 32,900. The ratio of styrene/butadiene in the polymer was 46/54 weight percent. The polymer was designated base elastomer IV.

Oil extended elastomer was prepared using Shellflex 371 oil per 100 parts of the neat star-block polymer. This was then used in a hard unit sole type formulation as follows:

| Ingredient | Parts(by weight) |
|---|---|
| Oil extended elastomer | 160.0 |
| Shellflex 371 oil | 80.0 |
| Crystal Polystyrene | 32.0 |
| Resin 18-290 | 18.0 |
| Hi-Sil 233 | 31.5 |
| Irganox 1010 | 0.45 |
| DLTDP | 0.45 |
| Tinuvin P | 0.45 |

The crystal polystyrene was Cosden 500S, a low molecular weight polystyrene sold by Cosden Oil & Chemical Company. The Tinuvin P is a stabilizer against ultraviolet light sold by Ciba-Geigy. Properties of the shoe sole compound are compared to those of similar compounds made with Kraton 4122 in Table III. The oil resistance values are estimated from results obtained by a slightly different test than described in Example II.

TABLE III

| Compound base | Kraton 4122 | IV |
|---|---|---|
| Shore A Hardness | | |
| (Injection molded) | 36 | 50 |
| Oil Resistance Test | | |
| (Flexes to Failure) | 200,000 | 400,000 |

As can be seen from the Table, shoe-sole compounds made with linear elastomer, Kraton 4122, would have approximately 50% of the resistance to oils as the star-block elastomer of the present invention.

The invention claimed is:

1. A composition useful as a shoe-sole compound consisting of:
   (a) 100 parts by weight of thermoplastic elastomer of 25 to 55% by weight of a monovinyl aromatic monomer and 45 to 75% by weight of a conjugated diene monomer of 4 to 8 carbon atoms, which elastomer has an average general formula $(A-B)_{\overline{m}}X$ where A is a non-elastomer polymer block based on the monovinyl aromatic monomer and having a number average molecular weight of from 10,000 to 35,000; B is an elastomeric polymer block based on the conjugated diene monomer and having a number average molecular weight of from 11,000 to 85,000; m is an integer between 7 and 12, and X is the radical of a polyfunctional coupling agent selected from o-divinylbenzene, m-divinylbenzene, p-divinylbenzene, and mixtures thereof;
   (b) about 80–250 parts by weight of a naphthenic extender oil;
   (c) about 40–150 parts by weight of a polystyrene material;
   (d) about 0–80 parts by weight of a finely divided filler; and
   (e) about 0–5.0 parts by weight of stabilizers.

2. The composition of claim 1 wherein said thermoplastic elastomer is a star-block copolymer of styrene (A) and 1,3 butadiene (B).

3. The composition of claim 1 wherein said finely divided filler is amorphous silica.

4. A shoe-sole having the composition of claim 1.

* * * * *